Figure 1:
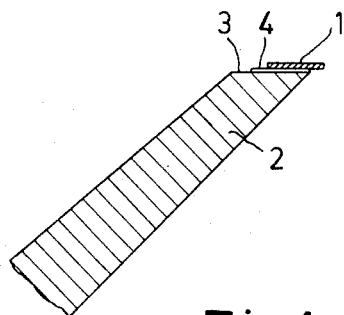

United States Patent
Knippenberg et al.

[15] 3,678,568
[45] July 25, 1972

[54] METHOD OF SECURING DIAMOND BY BRAZING

[72] Inventors: Wilhelmus Franciscus Knippenberg; Gerrit Verspui, both of Emmasingel, Eindhoven, Netherlands

[73] Assignee: U.S. Philips Corporation, New York, N.Y.

[22] Filed: June 29, 1970

[21] Appl. No.: 50,851

[30] Foreign Application Priority Data

July 2, 1969 Netherlands..........................6910115

[52] U.S. Cl..........................29/473.1, 29/504, 287/189.365
[51] Int. Cl...................................................B23k 31/02
[58] Field of Search..................29/473.1, 504; 287/189.365

[56] References Cited

UNITED STATES PATENTS

| | | | |
|---|---|---|---|
| 2,820,534 | 1/1958 | Hume | 29/504 X |
| 3,091,029 | 5/1963 | Davis et al. | 29/504 X |
| 3,192,620 | 7/1965 | Huizing et al. | 287/189.365 X |
| 3,377,696 | 4/1968 | Darrow | 287/189.365 X |
| 3,391,446 | 7/1968 | Buttle | 29/473.1 X |
| 3,477,118 | 11/1969 | Terrill | 29/473.1 X |

FOREIGN PATENTS OR APPLICATIONS 240,687 11/1959 Australia..............................29/473.1

*Primary Examiner*—John F. Campbell
*Assistant Examiner*—Ronald J. Shore
*Attorney*—Frank R. Trifari

[57] ABSTRACT

Method of securing diamond by means of brazing with a brazing filler consisting of an alloy of aluminum and silicon which contains from 8 to 18% by weight of silicon.

4 Claims, 3 Drawing Figures

PATENTED JUL 25 1972　　　　　　　　　　　3,678,568

INVENTORS
WILHELMUS F. KNIPPENBERG
GERRIT VERSPUI
BY

AGENT

METHOD OF SECURING DIAMOND BY BRAZING

The invention relates to a method of securing diamond by means of a brazing.

It is known that a mechanically very strong securement of diamond, in example for the manufacture of tools, may be effected with the aid of a brazing filler of titanium on the basis of silver and copper. In that case the wetting of the diamond surface is in fact effected by titanium or a compound of titanium and one of the other metals produced at the soldering temperature.

A drawback of the use of titanium is that it readily forms oxide or nitride; titanium oxide and titanium nitride do not contribute to the wetting of the diamond surface. In this known method soldering or brazing must therefore be performed in a vacuum or in an inert atmosphere. According to a further known method brazing is performed with an alloy of gold comprising at least 1 percent by weight and preferably approximately 5 percent by weight of tantalum and/or niobium. These alloys are less reactive to oxygen and nitrogen, so that brazing in a lower vacuum or in a less pure rare gas atmosphere may be performed without the disadvantages as in the case when using the previously mentioned titanium-containing copper-silver alloys.

A drawback of the two known methods described is that brazing is to be performed at a temperature of approximately 1,000°C when using the silver-copper alloys containing titanium and between 1,200° and 1,400°C when using alloys of gold containing tantalum and/or niobium because the alloys used have high melting points.

An object of the present invention is to obtain a satisfactorily adherent joint to diamond for which brazing is performed at temperatures which are lower than those mentioned above.

The present invention relates to a method of securing diamond by means of brazing in an inert atmosphere, characterized in that brazing is performed using an alloy of aluminum and silicon which contains from 8 to 18 percent by weight of silicon.

Alloys containing from 10 to 12 percent by weight of silicon are preferably used, because these have the lowest melting points.

The approximately eutectic alloys of aluminum and silicon which are used in the present invention melt at temperatures of from 570° to 670°C. Brazing may be performed at approximately 700°C with the aid of these alloys.

A further advantage of the method according to the invention is that brazing may be performed under less critical circumstances regarding the brazing milieu. To prevent oxidation of the alloys and attack of the diamond, the brazing operations (as in the previously known methods) are performed in a vacuum or in a protective gas as for example, nitrogen, hydrogen, or a rare gas. The presence of some oxygen is less disturbing than in the known methods.

An additional advantage is that the aluminum-silicon alloys are so ductile that they can satisfactorily be processed to form wire and foil. These material shapes render the performance of the soldering operation simple.

The alloys used herein are already known as brazing materials. However, it is not known that a particularly adherent joint to diamond may be established with these alloys.

Furthermore, it is advantageous in the present invention to use approximately eutectic aluminum-silicon alloys to which a small quantity of an element is added which may be active as an anti-oxidant during soldering, while the oxide formed therefrom has a wetting activity, for example, lithium.

The alloys used in the present invention make it possible to secure diamonds very tightly to materials having coefficients of expansion which are different from that of diamond, such as quartz, silicon carbide, graphite, ceramic material and metals, for example, tungsten, molybdenum, nickel and steel. The fact that good securement is obtained, which is in-sensitive to fluctuations in temperature, may relate to the ductility of the alloys.

It should be noted that aluminum alloys have already been proposed as binders for diamond grains in grinding tools and, for example, alloys of aluminum containing from 50 to 70 percent by weight of silicon. Due to their high melting points, these alloys are not suitable for the method according to the invention. Furthermore, these alloys have a certain brittleness and are not as adherent to diamond so that, as is required for grinding tools, blunted diamond grains are loosened. It is impossible to obtain a mechanically strong securement of single diamonds with such brittle alloys.

In order that the invention may be readily carried into effect, it will now be described with reference to a few Examples

EXAMPLE 1

As is diagrammatically shown in a cross-section in FIG. 1 of the accompanying drawing, a diamond cutting tool was manufactured by fixing a diamond plate 1 of 5 × 2 × 1 mm on a surface 3 of a steel holder 2 by means of the brazing layer 4.

To this end a piece of foil (thickness 20 $\mu$m) comprising aluminum-silicon alloy containing 12 percent by weight of silicon was laid on the surface 3 of the steel holder 2 and the diamond was placed thereon in such a manner that it partially extended sideways from the holder.

While the diamond plate 1 was mechanically fixed relative to the steel holder 2, for example, with the aid of a ceramic pin (not shown in the Figure) the assembly was subsequently heated in a furnace at 700°C for 1 minute in an atmosphere of technical argon.

EXAMPLE 2

Figure 2:
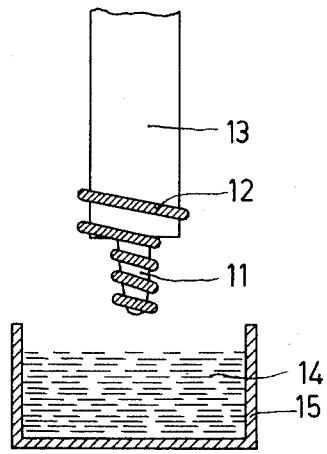

A diamond grammophone stylus was secured to a molybdenum support as follows (FIG. 2).

A rod-shaped diamond 11 (length 0.5 mm, diameter approximately 0.2 mm) was clamped with the aid of a spiral 12 of molybdenum wire to one end of a molybdenum rod 13 (diameter 0.8 mm). Subsequently, this end was immersed for 10 seconds in an aluminum-silicon alloy 14 containing 11 percent by weight of silicon which was kept molten in a carbon crucible 15 in a nitrogen atmosphere at 750°C. The alloy then flowed satisfactorily onto the diamond and the molybdenum and produced a tight securement. Finally, the diamond thus secured was ground.

EXAMPLE 3

Figure 3:
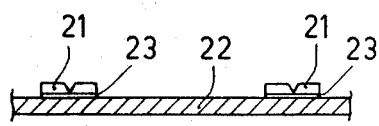

Diamond bearings for precision instruments, for example, watches (FIG. 3). Diamond bearings 21 having a conical bore were brazed on an assembly plate 22 of stainless steel with the aid of an aluminum-silicon alloy 23 (containing 13 percent by weight of silicon). To this end the bearings were mechanically fixed in predetermined areas with the interposition of foil of this alloy and the assembly was heated for 30 seconds in a nitrogen atmosphere at 700°C.

We claim:
1. A method of securing diamond to a support comprising brazing the diamond to the support in an inert atmosphere using an alloy consisting essentially of aluminum and silicon containing from 8 to 18 percent by weight of silicon.
2. The method of claim 1 wherein said brazing is performed using an alloy consisting essentially of aluminum and silicon containing from 10 to 12 percent by weight of silicon.
3. The method of claim 1 wherein said brazing is performed using an alloy containing a deoxidant the oxide of which has a wetting action.
4. The method of claim 3 wherein said deoxidant is lithium.

* * * * *